United States Patent [19]

Sugasawa et al.

[11] 4,249,374
[45] Feb. 10, 1981

[54] SPLIT ENGINE CONTROL SYSTEM WITH EXHAUST GAS RECIRCULATION

[75] Inventors: Fukashi Sugasawa, Yokohama; Haruhiko Iizuka; Junichiro Matsumoto, both of Yokosuka; Yukihiro Etoh, Yokohama, all of Japan

[73] Assignee: Nissan Motor Company, Limited, Yokohama, Japan

[21] Appl. No.: 2,632

[22] Filed: Jan. 11, 1979

[30] Foreign Application Priority Data

Jan. 12, 1978 [JP] Japan .................................. 53-2273[u]

[51] Int. Cl.³ .......................... F01N 3/15; F02D 17/00
[52] U.S. Cl. ........................................ 60/276; 60/278; 123/568; 123/198 F
[58] Field of Search ..................... 123/198 F, 119 A; 60/276, 278

[56] References Cited

U.S. PATENT DOCUMENTS 3,270,724  9/1966  Dolza ............................. 123/198 F
4,134,261  1/1979  Iizuka ............................... 60/276

Primary Examiner—Douglas Hart
Attorney, Agent, or Firm—Schwartz, Jeffery, Schwaab, Mack, Blumenthal & Koch

[57] ABSTRACT

Disclosed is a split engine control system wherein the intake manifold is segmented by a shut-off valve into a first chamber portion leading to a first group of cylinders and a second chamber portion leading to a second group of cylinders. During periods of relatively low load, the cylinders of the second group are deactivated and the shut-off valve is closed to isolate the second chamber from the first chamber to cut off air supply to the deactivated cylinders. Exhaust gases are recirculated through the deactivated cylinders so that their pumping loss is minimized. A pressure detector is provided to detect a pressure difference which might develop between the first and second chambers during the partial cylinder operation to control the flow rate of the recirculated gases until the pressure difference reduces substantially to zero.

3 Claims, 1 Drawing Figure

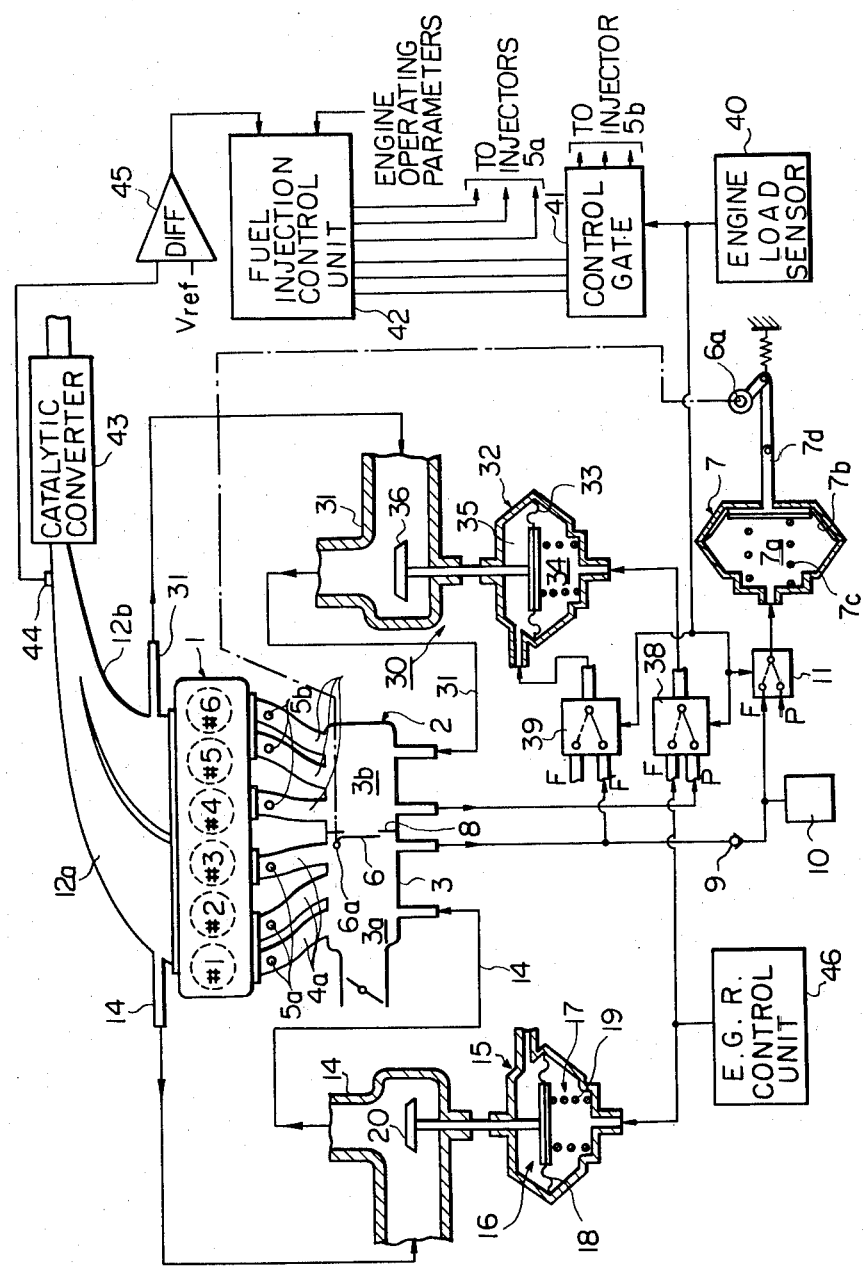

SPLIT ENGINE CONTROL SYSTEM WITH EXHAUST GAS RECIRCULATION

BACKGROUND OF THE INVENTION

The present invention relates to split engine operation and particularly to an exhaust gas recirculated split engine operation with a minimum of piston pumping loss during partial cylinder mode and with a minimum of transient problems when the engine is switched from partial to full cylinder mode.

Split engine control is well known in the art as a means for providing fuel economy when a vehicle can operate at reduced engine output power by deactivating certain of the cylinders and allowing the activated cylinders to operate at their maximum efficiency. Closed loop engine control using an exhaust gas sensor as a means for generating a feedback control signal and exhaust gas recirculation (EGR) are also well known as a means for reducing the exhaust emissions. Because of the need to meet fuel savings and emission standards, these known techniques are extensively used. However, a mere combination of these techniques would result in disadvantages. For example, split engine control would produce air-diluted exhaust gases if the deactivated cylinders are allowed to suck in and pump out intake air, so that the exhaust gas sensor would produce an enrichment signal which tends to over-enrich the activated cylinders. To prevent this over-enrich problem, the air supply to the deactivated cylinders should be shut off. A simple and efficient way of shutting off the air supply is to provide a shut-off valve in the air collector chamber of the intake manifold through which the manifold branches extend to respective cylinders so that, when the valve is closed air is admitted into a group of activated cylinders while preventing it from being admitted into the other cylinders during the partial cylinder operation. This will however produce a pumping loss in the deactivated cylinders since the pistons merely reciprocate therein during the partial cylinder operation. U.S. Pat. No. 947,638 filed Oct. 2, 1978, now U.S. Pat. No. 4,201,180, issued May 6, 1980, discloses a method for overcoming the aforesaid disadvantage by recirculating the exhaust gases through the deactivated cylinders. However, during the partial cylinder operation a pressure difference tends to develop between the segmented areas of the air collector chamber of the intake manifold due to the suspension of air supply to the deactivated cylinder group, and as a result higher pressure gases rush into the lower pressure area to cause an adverse effect on engine performance when full cylinder operation is resumed.

SUMMARY OF THE INVENTION

The present invention contemplates to detect a pressure difference between two segmented regions of an intake manifold during partial cylinder operation to regulate the flow of exhaust gases recirculated through deactivated cylinders in accordance with the detected pressure difference such that the pressure difference is substantially reduced to zero.

An object of the invention is therefore to provide an internal combustion engine control system which ensures fuel economy, reduced harmful emissions, reduced pumping loss and satisfactory engine performance during transitional periods of engine operation.

BRIEF DESCRIPTION OF THE DRAWINGS

The invention will be further described by way of example with reference to the sole drawing in which the engine control system of the invention is illustrated.

DETAILED DESCRIPTION OF PREFERRED EMBODIMENTS

In a split engine operating system according to the invention, shown in the sole drawing, the internal combustion engine has, for purposes of the disclosure, six cylinders, No. 1 through No. 6 shown schematically within a cylinder head 1. An intake manifold 2 has an air collector chamber 3 having a first subchamber 3a and a second subchamber 3b, and conduits 4a leading from the first subchamber 3a to the cylinders No. 1 to No. 3 and conduits 4b which connect the second subchamber 3b to cylinders No. 4 to No. 6. As will be described later, when the engine is at relatively high load all of the cylinders are activated and when at lower load only the cylinders No. 1 to No. 3 are activated. Emissions from the cylinders No. 1 through No. 3 are exhausted through a passage 12a to a three-way catalytic converter 43 and emissions from the cylinders No. 4 to No. 6 are exhausted through passage 12b to the converter 43. At a point upstream of the converter 43 is provided an exhaust gas sensor 44, such as zirconia oxygen sensor, to deliver a signal representative of the concentration of oxygen present in the exhaust gases to a differential amplifier 45 for comparison with a reference voltage Vref which represents a desired air fuel ratio.

A partition 8 having an opening therein is provided in the air collector chamber 3 of the intake manifold. This opening is shut off when the engine is at relatively low load by means of a control valve 6, pivoted as at 6a, when the latter is in a closed position to prevent fresh air from entering the second subchamber 3b and under such conditions fuel injectors 5b are deactivated.

The control valve 6 is operated by means of a pressure responsive actuator 7 which essentially comprises a pressure chamber 7a and a diaphragm 7b urged by means of a spring 7c and connected to a linkage 7d pivoted at 6a. The pressure chamber 7a is connected to the outlet port of a control valve 11 having two inlet ports, one inlet port F being connected to a vacuum tank or source 10 and the other port P being open to the atmosphere. This vacuum source is supplied with a vacuum through a check valve 9 from the first subchamber 3a. When the control valve 11 is switched to a position indicated by a solid line, when the engine is under low load, the diaphragm 7b is moved to the right, as shown, causing the linkage 7d to rotate the pivot axis 6a counterclockwise, so that the control valve 6 is brought to its closed position. When the engine is under high load the control valve 11 is switched to the vacuum side, as indicated by broken lines, and consequently the diaphragm 7b is caused to move to the left, thus rotating the pivot axis 6a in a clockwise direction.

An engine load sensor 40 is provided to detect when the engine is under relatively low load and provides a signal indicating such condition to a control gate 41 and also to control valves 11, 38 and 39 in order to switch from full cylinder position (F) to partial cylinder position (P).

Fuel injection control pulses, which are applied to injectors 5a and 5b, are developed in a fuel injection control unit 42 of conventional design after it has received signals indicating various engine operating parameters as well as a signal from the output of the differential amplifier 45. The pulse width of the fuel injection pulses is thus controlled in response to the received engine operating parameters as well as to the differential amplifier output which represents the deviation of air fuel ratio from the desired value. Therefore, the split engine control system of the invention operates in a closed loop mixture control mode in accordance with the detected engine exhaust gas concentration to control the air fuel ratio of the mixture supplied to the engine at a desired point, which is usually at or near the stoichiometric air fuel ratio, to thereby allow the three-way catalytic converter 43 to operate within its narrow range of high conversion efficiencies.

The fuel injection pulses for the fuel injectors 5a are supplied directly from the injection control unit 42, while the other injection pulses are supplied through the control gate 41 in response to the control signal from the engine load sensor 40.

To reduce the amount of the NOx component of the exhaust emissions, a first exhaust gas recirculation (EGR) conduit 14 is connected from the exhaust pipe 12a to the first subchamber 3a of the intake manifold 2 to return the exhaust gases emitted from the cylinders No. 1 to No. 3 to the first subchamber 3a of the intake manifold. Recirculation is controlled by means of a control valve 15 which includes a valve member 20 disposed in the passage 14, a diaphragm 18 which defines a vacuum chamber 17 and an atmospheric pressure chamber 16, the diaphragm 18 being connected to the valve member 20 for unitary movement therewith. The vacuum chamber 17, in which is provided a spring 19 to urge the diaphragm 18 toward the chamber 16, is supplied with a control vacuum from an EGR control unit 46 in response to engine operating conditions. The diaphragm 18 takes a position which is a balance between the pressures within the chambers 16 and 17 so that the valve member 20 moves in proportion to the control pressure to thereby control the amount of recirculated exhaust gases. This EGR control vacuum from source 46 is also supplied to the control valve 38 through an inlet port F.

In a similar manner, a second EGR conduit 31 is connected from the second exhaust pipe 12b to the second subchamber 3b to recirculate the gases emitted from the second group of cylinders No. 4 to No. 6 to the second subchamber 3b. Recirculation of cylinders No. 4 to No. 6 is effected by means of a similar control valve 30 to the control valve 15. The control valve 30 comprises a valve member 36 disposed in the passage 31 and a diaphragm 33 which defines chambers 34 and 35 on the opposite sides thereof, the chamber 34 being connected to an outlet port of the control valve 38 and the chamber 35 being connected to an outlet port of the control valve 39. The valve member 36 varies its position in accordance with the pressure difference between the chambers 34 and 35 to proportionally control the amount of gases which are recirculated through the deactivated cylinders No. 4 to No. 6.

The control valve 38 has a first inlet port F connected to EGR control circuit 46 and a second inlet port P which is connected to the second subchamber 3b. The control valve 39 has a first inlet port designated F which is open to the atmosphere and a second inlet port designated P connected to the first subchamber 3a. During the time when the engine is operated on full cylinders the control valves 38 and 39 remain switched to their F port positions, as indicated by broken lines.

Therefore, the chamber 35 is maintained at atmospheric pressure while the chamber 34 is maintained at the vacuum level of the chamber 17 of the first control valve 15, whereby the first and second exhaust gas control valves 15 and 30 are supplied with a control vacuum at equal pressures.

Conversely, when the engine is operated on partial cylinders, the engine load sensor 40 generates a control signal which causes the valves 38 and 39 to switch to the P port positions, as indicated by solid lines, whereby the pressure in the chamber 35 is brought to the pressure of the subchamber 3a, while the pressure of the chamber 34 is brought to the pressure of the subchamber 3b. Diaphragm 33 now tends to move in accordance with the pressure difference between the subchambers 3a and 3b. The control gate 41 is disabled by the control signal from the sensor 40 to deactivate the cylinders No. 4 to No. 6 and the control valve 11 is switched to the P port position to close the valve 6, so that the engine is operated on cylinders No. 1 to No. 3. Since the valve 6 is closed under this condition, the absolute pressure level in the subchamber 3b tends to reduce below the pressure in the subchamber 3a so that when the engine is later switched to the full cylinder mode, the high pressure gases in the subchamber 3a would burst into the subchamber 3b thereby adversely affecting the engine performance during such transient periods.

However, because of the feedback operation of the control valve 30, the gases recirculated to the subchamber 3b are increased in quantity in proportion to the pressure difference between chambers 34 and 35, and hence to the pressure difference between subchambers 3a and 3b until the pressure of subchamber 3b becomes equal to the pressure level of subchamber 3a.

During the full-cylinder operation all the cylinders are supplied with controlled recirculated exhaust gases and the air-fuel ratio is controlled at the desired point in response to the control signal from the exhaust gas sensor 44. During the partial cylinder operation with the shut-off valve 6 being closed to prevent entry of fresh air into the deactivated cylinders, the activated cylinders are supplied with controlled recirculated gases along an with appropriate amount of fresh air, and the air-fuel ratio for the activating cylinders is controlled to the desired point, while the deactivated cylinders operate merely to suck in and pump out the gases which are recirculated therethrough. Therefore, the pumping loss of the deactivated cylinders is reduced to a minimum, and with the pressure compensating action of control valve 30, the pressure difference between the subchambers 3a and 3b is reduced to a minimum, thereby eliminating the adverse effect which might otherwise occur during the transient period when the engine is switched from partial to full cylinder operation.

What is claimed is:

1. A control system for an internal combustion engine having first and second cylinders, an intake manifold having a first chamber portion connected to said first cylinder and a second chamber portion connected to said second cylinder, said first and second chamber portions being connected together in response to a relatively high engine load to allow introduction of air to said first and second cylinders, and means for deactivating said second cylinder in response to a relatively low engine load, comprising:

a shut-off valve responsive to said low engine load for isolating said first and second chamber portions from each other to prevent introduction of air into said second cylinder while allowing introduction of air into said first cylinder through said first chamber portion and responsive to said high engine load for allowing introduction of air into said first and second cylinders through said first and second chamber portions;

first exhaust gas recirculating means for recirculating a part of the exhaust gases through said first chamber portion and said first cylinder;

second exhaust gas recirculating means for recirculating a part of the exhaust gases through said second chamber portion and said second cylinder; and means responsive to said low engine load for detecting a difference in pressure between said first and second chamber portions and correspondingly regulating said gases recirculated through said second chamber portion to reduce said pressure difference substantially to zero.

2. A control system as claimed in claim 1, wherein said pressure difference detecting and regulating means comprises:

a housing having a diaphragm disposed therein to define a first pressure chamber and a second pressure chamber and a valve member disposed in said second exhaust gas recirculating means and secured to said diaphragm to regulate the flow rate of said recirculated gases in said second recirculating means in response to the movement of said diaphragm;

a first control valve for producing communication between said first chamber of said intake manifold and said first pressure chamber in response to said low engine load and for producing communication between atmospheric pressure and said first pressure chamber in response to the high engine load; and a second control valve for producing communication between said second chamber portion of said intake manifold and said second pressure chamber in response to said low engine load and for introducing a control vacuum into said second pressure chamber in response to said high engine load.

3. A control system as claimed in claim 1 or 2, further comprising an exhaust gas sensor for detecting the concentration of a predetermined constituent of the exhaust gases from said engine and generating a corresponding feedback electrical signal to control the air fuel ratio of the mixture supplied to said engine at a desired value which maximizes the conversion efficiency of a catalytic converter.

* * * * *